ically efficient than described in my U.S. Pat. No. 3,972,724.

United States Patent [19]
Entzmann

[11] 4,269,363
[45] May 26, 1981

[54] METHOD AND APPARATUS FOR REGENERATING AND REACTIVATING CEMENT

[75] Inventor: Karl Entzmann, St. Kathrein, Austria

[73] Assignee: Simmering-Graz-Pauker Aktiengesellschaft für Maschinen-, Kessel- und Waggonbau, Vienna, Austria

[21] Appl. No.: 46,184

[22] Filed: Jun. 6, 1979

[30] Foreign Application Priority Data

Jun. 26, 1978 [AT] Austria ............................. 4632/78

[51] Int. Cl.³ ............................................... B02C 7/04
[52] U.S. Cl. ................................ 241/30; 241/101 D; 241/261
[58] Field of Search ............... 241/101 D, 80, 261, 241/261.2, 261.3, 22, 29, 30, 152 A, 46.17; 106/103

[56] References Cited

U.S. PATENT DOCUMENTS

| | | | |
|---|---|---|---|
| 1,215,424 | 2/1917 | Spensley | 241/261 X |
| 1,724,072 | 8/1929 | Daniels | 241/152 A X |
| 2,090,363 | 8/1937 | Wendeborn | 241/101 D X |
| 2,623,700 | 12/1952 | Scherer | 241/261 X |
| 2,641,453 | 6/1953 | Teale | 241/46.17 X |
| 3,972,724 | 8/1976 | Entzmann | 241/261 X |
| 4,177,052 | 12/1979 | Entzmann | 71/33 |

FOREIGN PATENT DOCUMENTS 1471325 2/1971 Fed. Rep. of Germany ........... 241/261
2215599 11/1972 Fed. Rep. of Germany ............. 241/30

Primary Examiner—Mark Rosenbaum
Attorney, Agent, or Firm—Fleit & Jacobson

[57] ABSTRACT

A method of regenerating and reactivating inactive cement is disclosed. The method is performed in a disintegrator which includes a pin mill having beating pins arranged on two parallel counterrotating grinding disks in concentric alternating rings of increasing diameter. Inactive cement particles of a grain size of 7 to 10 mm are subjected to 3 to 8 mechanical beats within a time period of 0.01 to 0.001 seconds in the disintegrator and broken into separate particles of the original fineness or finer. In this manner, the separate particles are released from hydrated surface layers the cement particles thereby liberating non-hydrated layers.

8 Claims, 3 Drawing Figures

METHOD AND APPARATUS FOR REGENERATING AND REACTIVATING CEMENT

The specification describes a method of regenerating and reactivating inactive cement wherein the cement of a grain size of 7 to 10 mm is passed to a disintegrator in which it is subjected to three to eight beats per grain within a time period of 0.01 to 0.001 seconds in which the cement is broken into separate particles of the original fineness or finer so that the separate particles are released from their hydrated surfaces and rendered active by liberation of the non-hydrated layers within them. Once reactivated the cement may have green cement added to it and regenerated and green components being mixed together and homogenized.

The specification also describes apparatus for implementing the method which may comprise a modified pin mill which carries beating pins disposed in two parallel grinding disks driven in contrarotation in concentric rings increasing in diameter in alternation, and the apparatus may include a preliminary comminution unit with a screening unit and an arrangement to return oversize granular material to said comminution unit.

The invention concerns a method and apparatus for regenerating and reactivating cement, in particular cement that may at least partially be agglomerated and have become inactive after storage.

Cement is a water-based binding agent for concrete, and is one of the most important raw materials for the building industry. The capacity for producing cement is high but, in most areas of the world, demand is even higher and consequently it is necessary to use cement in the most economical fashion possible and to avoid unnecessary waste.

To be effective as a binding agent between aggregate materials in concrete, cement needs to be mixed with water. The various silicates and aluminates of calcium constituting the cement react with water to form differing hydrates that bind the aggregate materials together in a bridge-like structure (by virtue of their crystal configuration) and create a breccia-like, mechanically strong concrete structure.

The characteristic of cement in reacting with water and solidifying is vital to its use as a binding agent in forming concrete and is highly advantageous, but it also means that cement stored in unfavourable conditions or for too long becomes inactive. Since the hydration of cement is dependent solely on the addition of water to it and not on the presence of aggregate materials or the introduction of green concrete into framework even the ambient humidity brings about a change in the surface, at least, of cement particles in time. In view of the high specific surface area of high-strength cements in particular the sensitivity of cement to moisture, even in vapour form, is high. Consequently it is not surprising that stored cement solidifies, on the surface at least, and forms hard lumps and skins and that even within such lumps and beneath these skins the cements ability to solidify and harden declines appreciably. Such effects may be observed in damp climates for example in the tropics, and also in temperate climates during cool and damp times of the year. Naturally the process of deactivation of cement is aided by unforeseen or unavoidable delays which prolong its storage on building sites or in temporary stores and by delays in shipment, particularly in ships and thus near expanses of open water.

Since it is unsatisfactory to discover that cement, after prolonged shipment or protracted (and often compulsory) storage, has become largely unusable due to its partial agglomeration and deactivation ways have been sought to regenerate the cement and make it usable.

The present invention aims to provide method and apparatus enabling the regeneration of inactive cement.

According to one aspect of the invention there is provided a method of regenerating and reactivating inactive cement wherein the cement of a grain size of 7 to 10 mm is passed to a disintegrator, comprising a modified pin mill which carries beating pins disposed on two parallel grinding disks driven in contrarotation in concentric rings increasing in diameter in alternation, to three to eight beats per grain within a time period of 0.01 to 0.001 seconds, in which it is thereby broken into separate particles with the original fineness or finer so that the separate particles are released from the hydrated surface layers encasing them and rendering the inactive and are reactivated by the liberation of nonhydrated layers.

A second aspect of the invention provides apparatus for regenerating inactive cement, the apparatus comprising a modified pin mill which carries beating pins disposed on two parallel grinding disks driven in contrarotation in concentric rings increasing in diameter in alternation.

When comparing the strengths of concrete testpieces made with cement of the same fineness and from the same origin, the cement of one piece having been ground in a conventional manner (using ball mills) and the cement of the other using a so-called disintegrator, it was found that the concrete made with cement processed in a disintegrator reached greater strengths after shorter times than that made using cement ground in ball mills.

The properties of cement that had become inactive were also examined after grinding in a disintegrator.

A disintegrator is the name given to a class of modified pinned-disk mills that operate, preferably, at comparatively high beating speeds. Beating pins are disposed in circular rows on two disks that are located parallel with one another and driven in opposite directions these pins have different shapes depending upon the intended application, usually taking the form of flat elements that are not aligned radially but disposed with the outer edge leading. Such rows are disposed concentrically with increasing diameters in alternation between the two disks so that solid material fed in at the centre of the disks is hurled to and fro at high speed in very fast cycles by the rows of beating pins rotating in opposite directions alternatively and is finely comminuted in the process due to the very high vibratory stress.

One characteristic of comminution in disintegrators is that in many cases it also goes beyond structural grain-size limits. This is probably due to the high impact speeds which cause extremely brief elastic distortions to occur, which ultimately lead to the break-up of the junctions between different lattices. Since the hydrated surface layers of cement particles must be regarded as being of a material different to that of the interior of the particles, the aim is to burst three surface layers and release the unaffected interior material. Here it must be remembered that the object is to regenerate cements that have become inactive and not cements that have fully hardened.

On average the inactive cement, once regenerated in a disintegrator, attains 85% of its original normal strength. By combining it with green, fully active cement it is possible to bring the mixture wholly up to 100% of the normal strength. In this way the 15% loss in strength may be offset and there is then no need to increase the proportion of cement used.

To compare the properties of regenerated cements, testpieces were made for flexural tensile strength tests using the same concrete formulation and stored for 72 hours at 75° C. The testpiece made solely with regenerated cement attained flexural tensile strengths of 52–55 kg/cm2; when the same and double the quantity of green cement from the same origin and of the same quality were added to the cement that had become inactive during regeneration in the disintegrator, the flexural tensile strength rose to 62–65 kg/cm2 and 65–70 kg/cm2 respectively.

Under the same conditions the compression strengths reached 305 kg/cm2, 380 kg/cm2 and 435 kg/cm2. Very similar values were obtained at 28 days storage at room temperature. The conclusion to be drawn from the results of the tests is that core concrete for example in solid concrete structures may be prepared using only regenerated cement without adding green cement, while half of the green cement can be made up with regenerated cement for structures subject to higher loadings.

Comparison testpieces made exclusively with green cement, that was not treated in the disintegrator however, attained the strengths of the specimens with a 1:1 disintegrated mixture.

In the method and apparatus embodying this invention the degree of pulverization and the degree of activation (the high impact speeds not only break-up the solid material but also produce lattice flaws through which latent energy is imparted to the pulverized material and this can be used later to ensure easier or more complete execution of chemical or physico-chemical reactions for example; note the higher concrete strengths mentioned previously when using disintegrated cements ground down to the same degree of fineness) are influenced by the choice of beating cycles (which is a function of the number of rows of beating pins), the beating cycle timing (which is a function of the distance between the rows of beating pins) and the impact speed (which is a function of the diameter of the grinding disks and the machine speed). The optimum operating conditions may easily be found for given types of cement by making corresponding preliminary tests. A small laboratory disintegrator may be used to this end. As the "optimum" range for cement is not very narrow, the chances of gross error are slim.

Features of the invention will now be explained with reference to the accompanying drawings in which.

Figure 1:
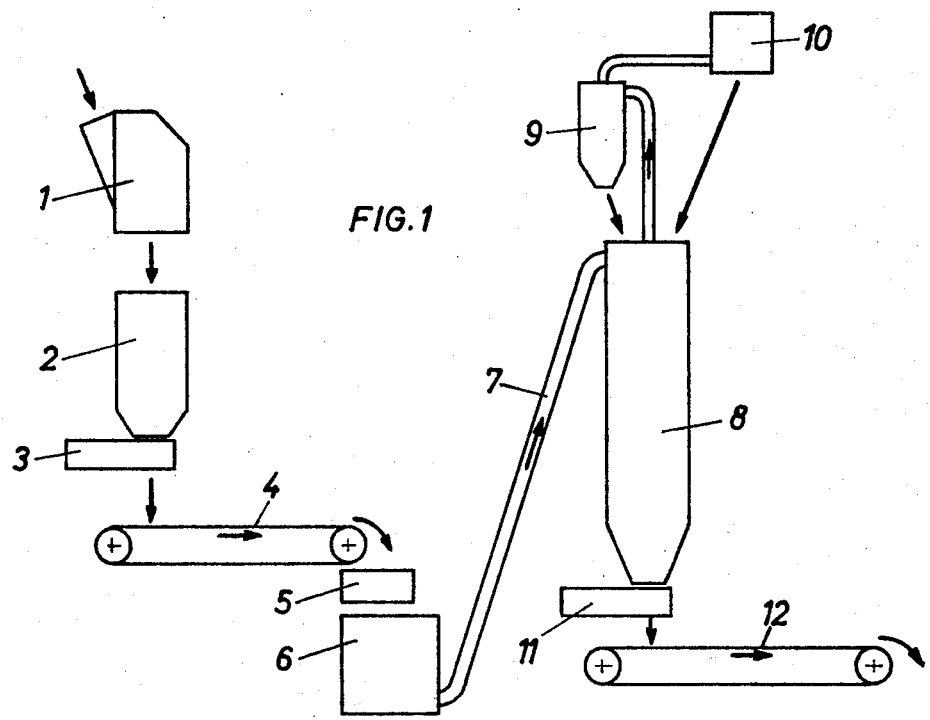
FIG. 1 is a block diagram of a device embodying the invention.

The device shown in simplified form in FIG. 1 comprises a slow-running hammer mill or impact pulverizer 1 equipped with a screening grating and an arrangement to return particles that are too large (so-called screen residue) to the mill.

Material passes from the mill 1 to an intermediate bunker 2 having an extractor-feeder 3 and by a conveyor belt 4. Conveyor 4, feeds, through an associated metal extractor 5, a disintegrator 6. This consists of two opposing parallel discs (not shown) each of which carries axially projecting pins disposed in concentric rings, each ring of pins on one disc being disposed with minimal clearance or radial gap between two adjacent rings of pins on the other disc. The two discs can be made to contrarotate rapidly.

Figure 2:
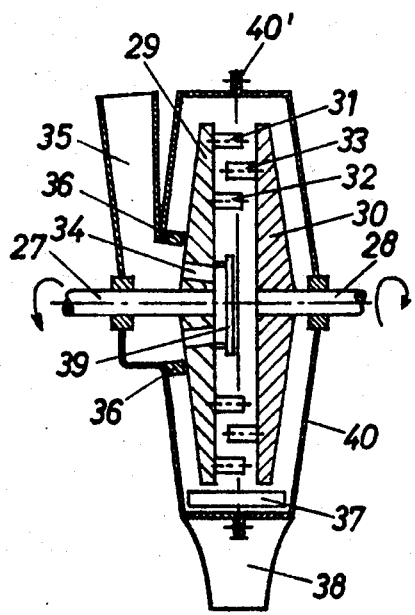
FIG. 2 is a simplified longitudinal section of a disintegrator suitable for treating cement.
Figure 3:
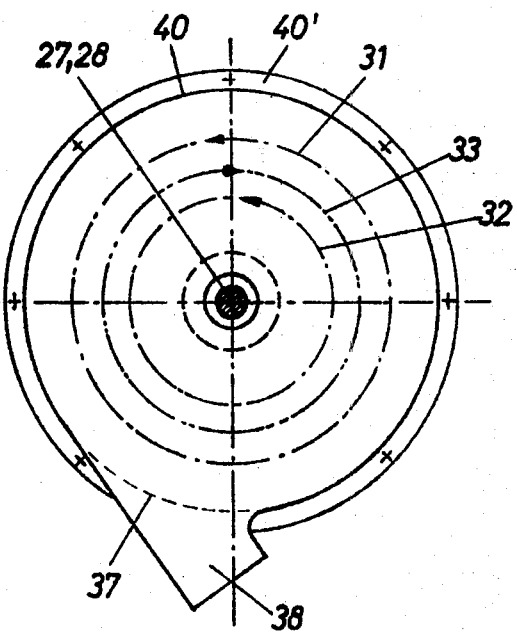
FIG. 3 is a cross-sectional view of the disintegrator of FIG. 2.

The disintegrator 6 is described in greater detail with reference to FIGS. 2 and 3, and comprises two shafts 27 and 28 with their axes aligned and each having one grinding disc, 29 and 30 respectively, fixed to their ends.

Near the centre of one of these grinding discs are openings 34 through which material to be comminuted may pass. A deflecting guide plate 39 is located in front of the inlet openings. In front of the inlet openings 34 there is a chamber 35 through which the material to be comminuted is fed. Ring seals 36 are arranged to prevent material outside the grinding disc 29 from reaching a discharge chamber 38 through discharge opening 37 by bypassing the grinding and beating pins located in rows 31, 32 and 33, on the adjacent faces of the discs 29 and 30.

The grinding disks are enclosed in a casting 40 that may be opened along a flange 40'.

The discs are rotatable as shown by the arrows in the drawings such that the pins are made to contrarotate from one row to the next.

Devices of the kind described have been known for a long time. A feature common to most of them is that the beating pins are of cylindrical cross-section, producing very wide scattering of the particles accelerated by them. But for the present purpose a suitable device is one with non-cylindrical beating elements which is capable of imparting directional acceleration.

Material is fed in axially at the centre of the disc 29 and picked up by the suction of the air flowing through (or perhaps of an inert gas) and the centrifugal force and hurled outwardly. In the process it passes into the beating zone of the innermost row of pins and undergoes an almost tangential acceleration which is converted into an opposite and again almost tangential acceleration by the next outermost contrarotating row of pins. This is repeated from one row of pins to the next until the particles leave the zone of the rotor. Dependent on the speed of rotation of the discs and the radii of the rows of pins, impact speeds of 50 to over 300 m/sec are attained. The particle impact energy depends on particle mass and the resistance the surrounding gas offers to particle movement. By varying the speed of rotation, influence may be exerted on the comminution effect, the mechano-chemical activation effect, and the energy to be stored by the particles. As regards externally perceptible effects of energy stored in this way, desired properties may be optimised in accordance with the process by constantly monitoring a desired parameter and using the monitoring result to control the speed and thus the acceleration of the particles of their ultimate speed.

The peripheral speed of the rows of beating pins and their number have a decisive influence on the desired grain size distribution. These characteristic values must first be established by tests for a given type of cement. The product can be influenced by the choice of grinding discs and drive. Here the decisive factor is the number of rows of beating pins, their mean and their maximum diameter and the speed of rotation of the discs carrying the pins. Depending on the kind of cement, favourable results are ususally obtained with maximum impact speeds between 75 m/s and 240 m/s. In the interests of favourable wear, the disintegrator will run at the barely adequate minimum speed found by tests, preferably with the peripheral speed of the outermost ring of beating pins of 75 to 125 m/s.

The disintegrator 6 is linked be means of a pneumatic conveyor 7 to a relatively large silo 8 that is fitted with a cyclone separator 9 and a filter 10 for the outgoing conveyor air. At the bottom end of the silo there are a metering discharge device 11 and a conveyor belt 12.

The process in accordance with the invention is implemented by the described device in the following manner:

First lumps of cement undergo preliminary pulverisation in the slow-running hammer mill or impact pulverizer 1 until they can be introduced into the disintegrator 6. Oversize material is either retained in the mill 1 by the screening grating or the pulverized material is passed through a screen and the screen residue is returned to the mill (not shown in FIG. 1).

After preliminary pulverisation the cement is expediently stored in the intermediate bunker 2 and passed from this to the conveyor belt 4 by the feeder 3 as required. Intermediate storage checks material surges which could be caused by feeding in large lumps of cement.

The metal separator (or metal detector) 5 keeps any metal items away from the disintegrator. The cement is regenerated in the disintegrator 6.

The deactivated cement reduced to a grain size of about 7 to 10 mm or already of this size is subjected to very rapid and frequent blows by the beating pins on the two very rapidly contrarotating discs of the disintegrator, each grain being beaten three to eight times within a period of 0.01 to 0.001 seconds. Through this, the particles fed into the disintegrator are broken down into separate particles of the original fineness or finer so that all the grains are freed of the hydrated surface layers encasing them and rendering them inactive and are reactivated by the liberation of non-hydrated layers.

The product exhibits roughly the original or better fineness and on average has 85% of the normal strength of the original cement.

Since by virtue of its design and the way in which it works the disintegrator functions like a blower, the regenerated cement is blown out of the unit pneumatically. It passes to the silo 8 and the entrained air is passed through a dust cyclone 9 and the filter 10. The quantities of cement dust collected in the cyclone 9 and the filter 10, as shown in the drawings, are returned to the silo 8. From the silo the regenerated cement is removed by the metering unit 11 and taken away for further use by the conveyor belt 12.

Advantageously, prior to regeneration, latently hydraulic substances such as blast furnace slag, pulverized fuel, ash, trass, pozzolan etc. are added to the inactive cement and are thoroughly mixed with it and homogenized during regeneration. With advantage gypsum or anhydrite is added to the inactive cement to be regenerated to regulate the setting behaviour and in that it is regenerated with this additive and in the process thoroughly mixed with the additive and homogenized.

It is expedient to make the regenerating plant of such a size that it can regenerate more cement than can be used at any time and not to run it continuously. On average one should only regenerate as much cement as can be used at any time as the regenerated cement is more susceptible to further deactivation than the agglomerated inactive cement. If stored in damp surroundings (provided it is not stored in water or in distinctly wet containers) the latter will lose further latent activity more slowly than the regenerated cement.

What we claim is:

1. A method of regenerating and reactivating inactive cement particles having a grain size of 7 to 10 mm and having hydrated surface layers, comprising:

feeding said cement particles to a disintegrator, which disintegrator includes a pin mill having beating pins arranged on two parallel counterrotating grinding disks in concentric alternating rings of increasing diameter, and in the disintegrator, subjecting said cement particles to from 3 to 8 mechanical beats by said pins within a time period of 0.01 to 0.001 seconds, such that said cement particles are broken into separate particles of a grain size of 7 to 10 mm or finer, with said separate particles being released from said hydrated surface layers of said cement particles thereby liberating non-hydrated layers of said cement particles.

2. The method of claim 1 in which green cement is added to said cement particles prior to feeding said cement particles to the disintegrator, said green cement and said cement particles being mixed together and homogenized during the subjecting step in the disintegrator.

3. The method of claim 1 in which a latently hydraulic substance selected from the group consisting of blast furnace slag, pulverized fuel, ash, trass and pozzolan is added to said cement particles prior to feeding said cement particles to the disintegrator, said cement particles and said latently hydraulic substance being mixed together and homogenized during the subjecting step in the disintegrator.

4. The method of claim 1 in which gypsum is added to said cement particles prior to feeding said cement particles to the disintegrator, said gypsum and said cement particles being mixed together and homogenized during the subjecting step in the disintegrator.

5. The method of claim 1 in which anhydrite is added to said cement particles prior to feeding said cement particles to the disintegrator, said anhydrite and said cement particles being mixed together and homogenized during the subjecting step in the disintegrator.

6. The method of claim 1 in which said beating pins attain impact speeds of from 50 to over 300 meters per second.

7. The method of claim 1 in which said beating pins attain impact speeds of from 75 to 240 meters per second.

8. The method of claim 1 in which said beating pins attain impact speeds of 75 to 125 meters per second.

* * * * *